United States Patent

LaBarbara et al.

[11] Patent Number: 4,598,821
[45] Date of Patent: Jul. 8, 1986

[54] HOLDER ASSEMBLY FOR MINIATURE ELECTRONIC COMPONENTS AND METHOD OF FABRICATION

[75] Inventors: A. Franklin LaBarbara, Eaton's Neck; Jeffrey Cann, Islip; Carey Evans, Huntington, all of N.Y.

[73] Assignee: Phase Industries Inc., Huntington Station, N.Y.

[21] Appl. No.: 549,476

[22] Filed: Nov. 7, 1983

[51] Int. Cl.⁴ .............................................. B65D 73/02
[52] U.S. Cl. ...................................... 206/329; 206/331
[58] Field of Search ............... 206/329, 330, 331, 346, 206/347, 488, 489, 485, 562

[56] References Cited

U.S. PATENT DOCUMENTS

| | | | |
|---|---|---|---|
| 3,097,360 | 7/1963 | Carlson, Jr. et al. | 206/346 |
| 3,342,327 | 9/1967 | Newton | 206/347 |
| 3,390,783 | 7/1968 | Quackenbush, Jr. | 206/488 |
| 3,397,453 | 8/1968 | Gwyn, Jr. | 206/330 |
| 3,545,606 | 12/1970 | Bennett et al. | 206/329 |
| 3,892,313 | 7/1975 | Lange | 206/346 |
| 4,109,788 | 8/1978 | Hirose et al. | 206/329 |
| 4,442,938 | 4/1984 | Murphy | 206/329 |

FOREIGN PATENT DOCUMENTS

| | | | |
|---|---|---|---|
| 2935043 | 8/1979 | Fed. Rep. of Germany | 206/329 |
| 560637 | 7/1973 | Switzerland | 206/329 |

Primary Examiner—Joseph Man-Fu Moy
Attorney, Agent, or Firm—Edward H. Loveman

[57] ABSTRACT

A holder assembly for miniature electronic components and method for fabricating the holder assembly comprises two superimposed metal or plastic plates having a multiplicity of centrally aligned first holes. An elastic sheet is disposed between the plates and is bonded to inner sides of the plates to form a laminated assembly. A multiplicity of other holes in the sheet, are smaller than the first holes, and are in central alignment with the first holes to define elastic annular rims. A frame is mounted around the laminated assembly. The first holes may be countersunk. The plates may be made of electrically insulative material.

8 Claims, 14 Drawing Figures

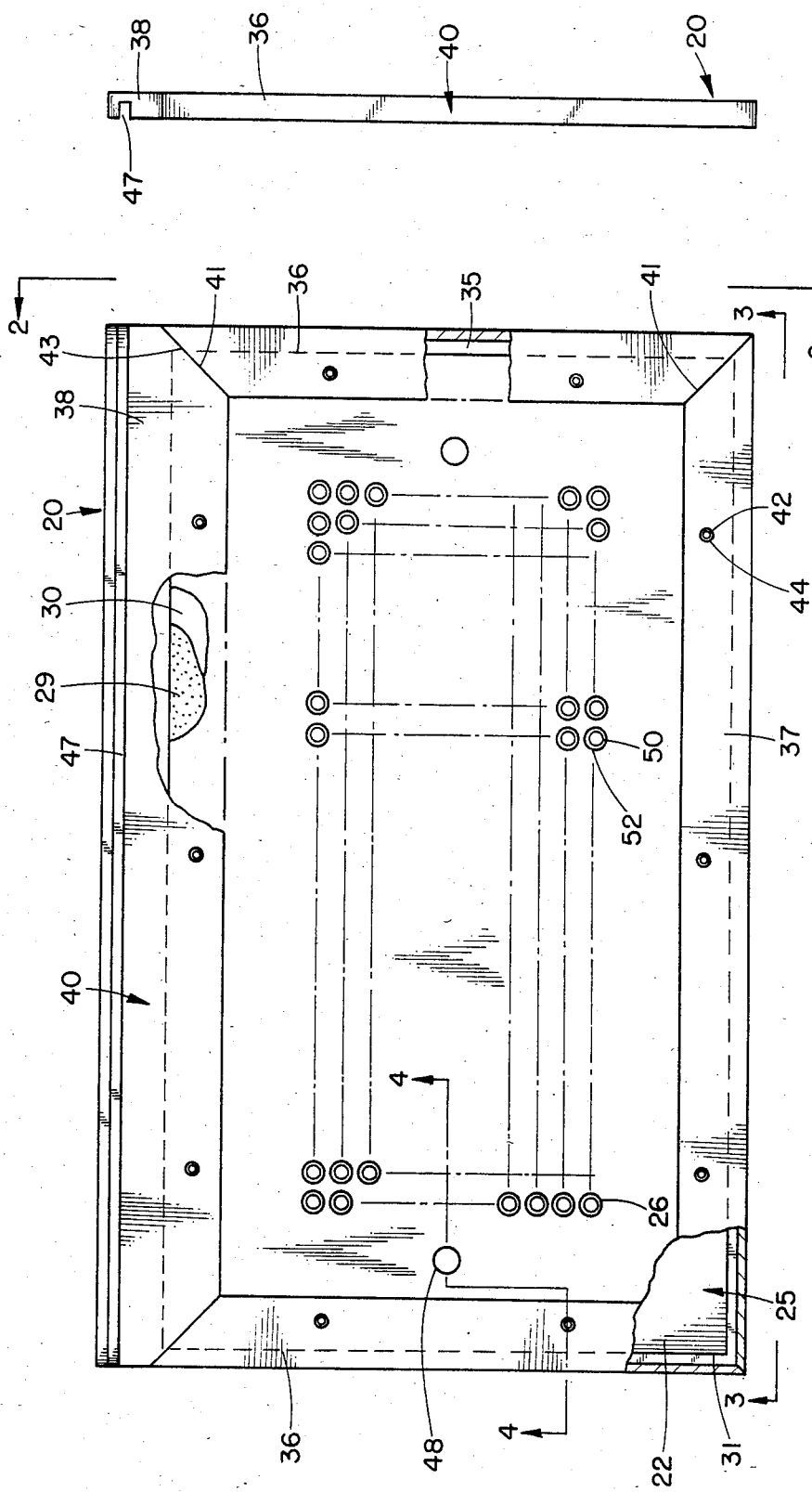
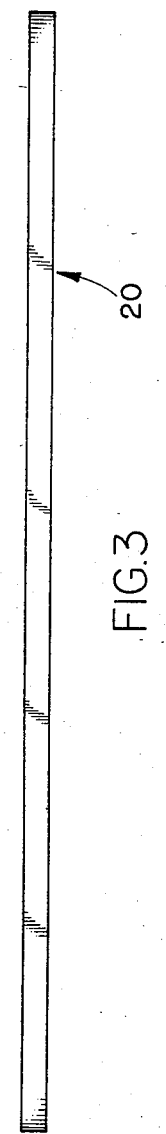
FIG.1  FIG.2  FIG.3

HOLDER ASSEMBLY FOR MINIATURE ELECTRONIC COMPONENTS AND METHOD OF FABRICATION

This invention concerns a holder for miniature electronic components and more particularly involves a plate assembly adapted for holding simultaneously a multiplicity of minature components such as resistors or capacitors.

In one method of manufacture of miniature electronic chip components, it is necessary to dip opposite end of the components in a metallic bath to coat the ends with thin electrically conductive films. One particularly difficult problem has been the unavailability of satisfactory means for holding the components while they are being coated with the matallic films. When the units are held manually by a tweezer or similar device, only a few units may be processed at a time. When hundreds or thousand of components must be processed simultaneously, the problem of holding the units becomes formidable.

Various expedients have been proposed to solve the problem, but they are too complex or unreliable. What is needed is a holding device into which a multiplicity of electronic components may be quickly and securely inserted, to remain in place while both ends of the components are treated, and from which the components may be quickly and easily removed.

It is therefore a principal object of the present invention to provide a holder for a multiplicity of electronic components, which holder comprises two apertured plates with a perforated elastic sheet secured therebetween to form a laminated assembly.

A further object of the present invention is to provide a laminated assembly of the character described, in which a multiplicity of holes in the plates are centrally aligned with smaller holes in the elastic sheet, to define sockets with an elastic wall for frictionally gripping and removably holding the miniature electronic components while being processed.

Another object of the present invention is to provide a laminated assembly as described, wherein the outside plates are made of metal or of electrically insulative material, while the elastic sheet is made of heat resistant, dimensionally stable, synthetic rubber.

Still another object of the present invention, is to provide a novel method of fabricating a laminated holder for a multiplicity of electronic components.

These and other objects and many of the attendant advantages of this invention will be readily appreciated as the same becomes better understood by reference to the following detailed description when considered in connection with the accompanying drawings in which:

FIG. 1 is a plan view of a holder assembly embodying the invention, portions being broken away to show internal construction;

FIG. 2 is an end edgewise view taken along line 2—2 of FIG. 1;

FIG. 3 is a lateral edgewise view taken along line 3—3 of FIG. 1;

Figure 4:
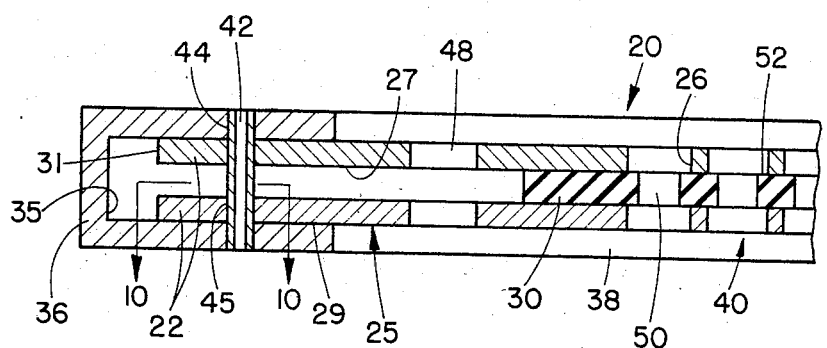
FIG. 4 is an enlarged, fragmentary vertical sectional view taken along line 4—4 of FIG. 1.
Figure 6:
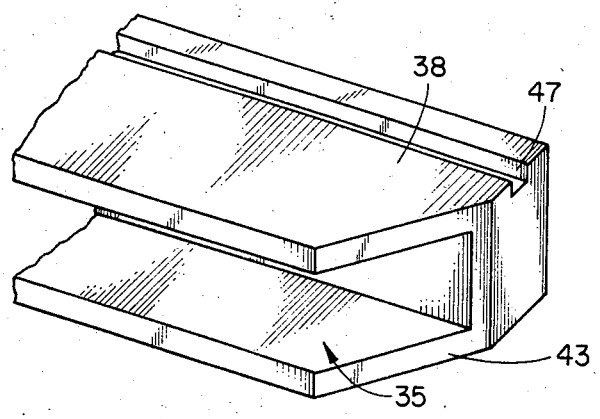
FIG. 6 is an enlarged perspective view of a portion of another frame member.

Referring now to the drawings wherein like reference characters designate like or corresponding parts throughout, there is illustrated in FIGS. 1-4, a holder assembly, generally designated by reference numeral 20 embodying the invention. The assembly 20 has two thin identical rectangular metal plates 22. Each of the plates 22 has a multiplicity of line and rows of round, cylindrical holes 26 in a rectangular array. The holes 26 are close together in each of the plates 22 to provide a maximum number of holes in a plate of given size. The holes 26 are centrally aligned in both plates 22.

All holes 26 are of equal size. Disposed between the plates 22 is an elastic rectangular rubber sheet 30. Both sides of the sheet 30 are bonded by suitable cement 29 to the inner adjacent sides 27 of the plates 22 to form a unitary, laminated structure or assembly 25.

Figure 10:
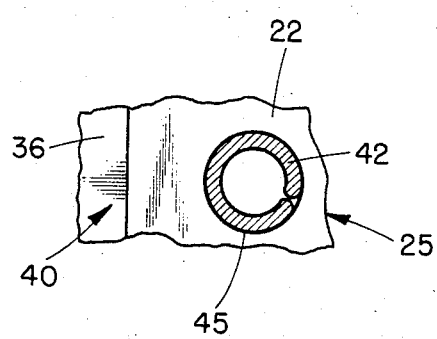
FIG. 10 is a further enlarged horizontal cross sectional view taken along line 10—10 of FIG. 4.

Edges 31 of the plates 22 are disposed inside internal grooves 34 in the two side channel members 36, and the top and and bottom channel members 37, 38, defining a rectangular frame 40 (see FIGS. 1, 4, 5, and 6). Ends 41, 43 of the frame members 36, 37, and 38 are beveled to abut each other. Round spring roll pins 40, 42 (see FIGS. 1, 4, and 10) are inserted through aligned holes 44, 45 in the frame members 36, 37, and 38 and edges of the plates 22 to secure the laminated assembly 25 in the 40 frame. The frame 40 stiffens the laminated assembly 25. Two holes 48 are provided near opposite ends of the plates 22 and in registration in the two plates 22 for a purpose described below. A channel 47 may be provided in one side of frame member 38 for a purpose described below. Holes 50 are provided in the sheet 30. The diameters of the holes 50 are smaller than the holes 26 with which all holes 50 are centrally aligned. By this arrangement, an elastic annular rim 52 is defined and exposed in each of holes 26 at each side of the plates 22.

Figure 7:
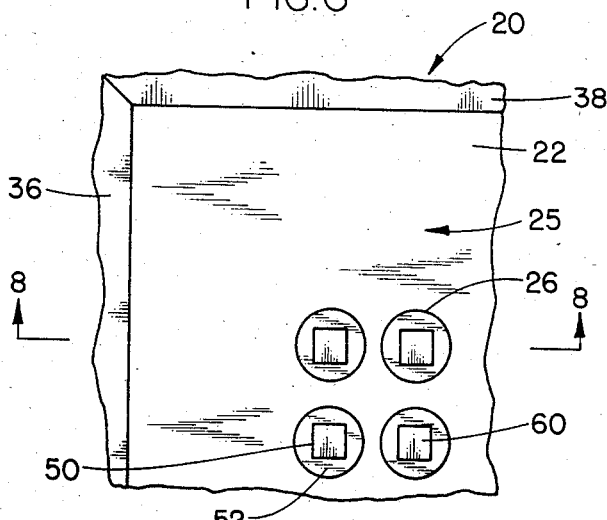
FIG. 7 is an enlarged plan view of a portion of the holder assembly, with a plurality of electronic components held therein.
Figure 5:
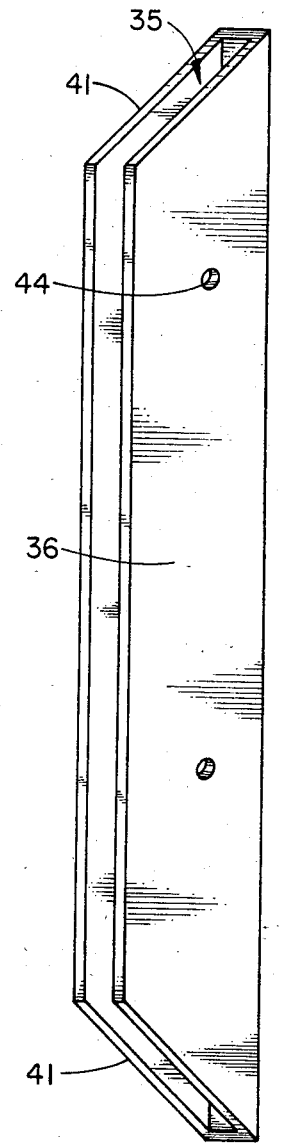
FIG. 5 is an enlarged perspective view of a frame member employed in the assembly.
Figure 8:
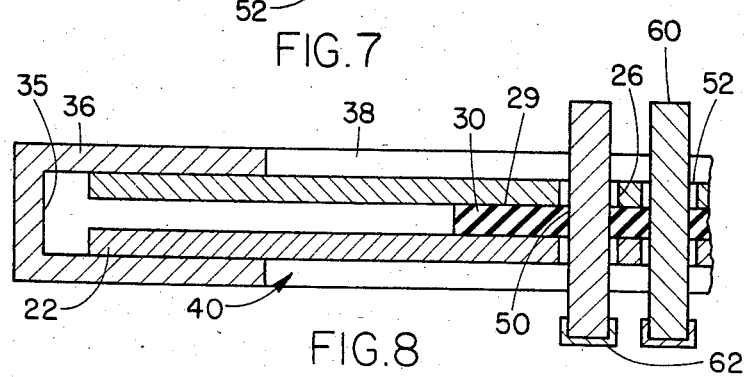
FIG. 8 is a fragmentary cross sectional view taken along line 8—8 of FIG. 7.
Figure 9:
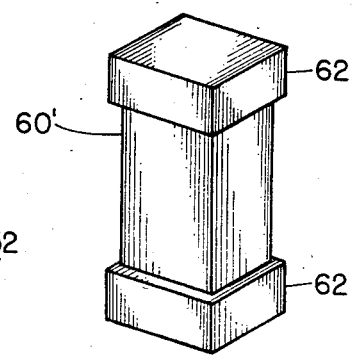
FIG. 9 is a further enlarged perspective view of a miniature electronic capacitor as processed by used of the holder assembly.

FIGS. 7 and 8 show one type of miniature component 60 which may be processed by means of the holder assembly 20. Each component 60 is rectangular in cross section and its length is longer than the thickness of the laminated assembly 25. The length of the device may exceed the thickness of the frame 40. When the component 60 are inserted through the holes 50, the elastic annular rims 52 yield and frictionally grip the sides of the component 60.

In one manufacturing process, the entire loaded assembly 20 will be lowered in a horizontal position into a metallic bath until the coplanar exposed bottom ends of the component 60 through the liquid surface. The assembly may be supported in a jig to facilitate this step, with part of the jig engaged in the groove or channel 47 in the frame 40. The components 60 will take up thin metallic films 62 which will cover the immersed end of the components 60. This will allow the coating of both ends of the component 60.

If desired, the components can be cylindrical, i.e. round in cross section, rather than square or rectangular. After the coating has set and dried, the components may easily be pushed out of the holder assembly 20. The holder assembly 20 may be made in any desired size, holding any desired number of miniature components to be processed, for example 500 or 1000 or other large numbers. Other components such as resistors, inductors, electronic chips, etc . . . may be processed in this holder assembly.

Figure 11:
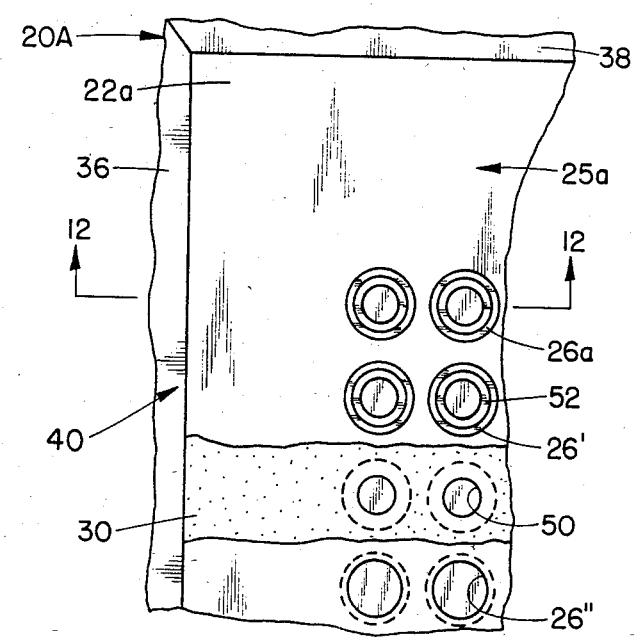
FIG. 11 is a plan view similar to FIG. 7 showing a modification of the invention.
Figure 12:
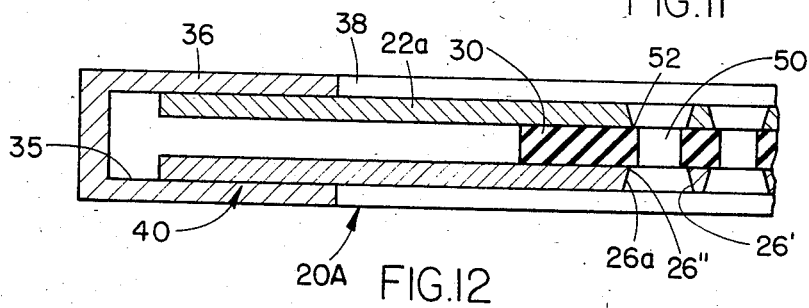
FIG. 12 is a vertical sectional view taken along line 12—12 of FIG. 11.

FIGS. 11 and 12 show another holder assembly 20A which is identical to holder assembly 20 in every respect, except that each hole 26a in plates 22a of laminated assembly 25a is countersunk, with the wider end 26' of each conical hole at the outer side of each plate 22a and smaller end 26" inside. This arrangement facilitates insertion of the electronic components 60 into the holes in the plates 22a and through the holes 50 in the sheet 30.

In order to grip the electronic components properly, by the rims 52, each component 60 should be slightly larger in its diameter or its largest cross sectional dimension than the diameter of each of the holes 30, but should be smaller than the diameter of each of the holes 26 or the smallest diameter of each of the holes 26a.

Figure 13:
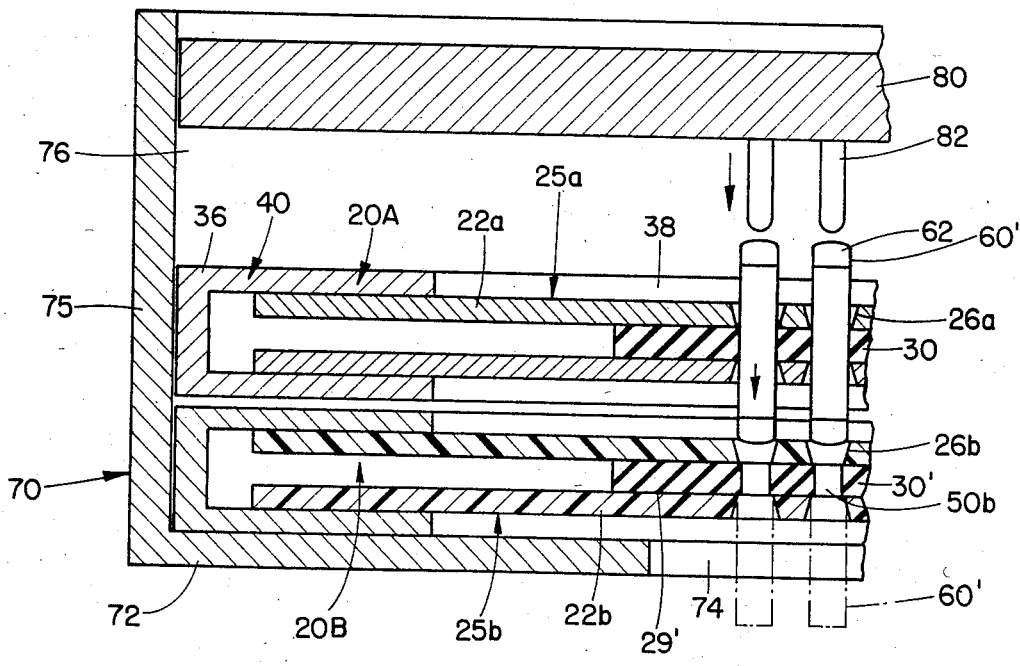
FIG. 13 is a vertical sectional view through an assemblage of apparatus utilizing two holder assemblies and illustrating an application of the invention.

FIG. 13 shows another holder assembly 20B in which a laminated assembly 25b has plates 22b made of electrically insulative material such as suitable plastic. Inner sides of plates 22b are bonded by cement 29' to opposite sides of an elastic rubber sheet 30' disposed between the plates 22b. The plates 22b have countersunk holes 26b.

FIG. 13 also illustrates an advantageous application of the invention. Here a loaded holder assembly 20A and an unloaded holder assembly 20B are superimposed on each other in a rectangular jig 70 having an open top. A bottom wall 72 has a rectangular hole 74 where the holes 26b and 50b in the bottom holder assembly 20B are exposed. The jig 70 has flat sides 75, 76. Completed electronic capacitors 60' with coated films 62 at their ends are disposed in the upper holder assembly 20A. The components 60' are axially aligned with the holes 50b in the holder assembly 20B. A rectangular pusher plate 80 having a multiplicity of depending prongs 82 in rectangular array and axially aligned with the holes 26a and the holes 30, 30' in the laminated assemblies 25a 25b, is inserted in the open top of the jig 70. When the pusher plate 80 is pushed down, the prongs 82 will contact all the components 60' and will push them all down simultaneously into engagement with the holder assembly 20B as indicated by the dotted lines in FIG. 13. By this arrangment five hundred, one thousand, or more electronic components 60' may be simultaneously transferred from one holder assembly to another. The holder assembly 20B with insulative plates 22b is adapted for use in electrically testing finished electronic components 60' with no danger of short circuiting the components, as could occur with the metallic plates 22 or 22a of the holder assemblies 20 or 20A.

Figure 14:
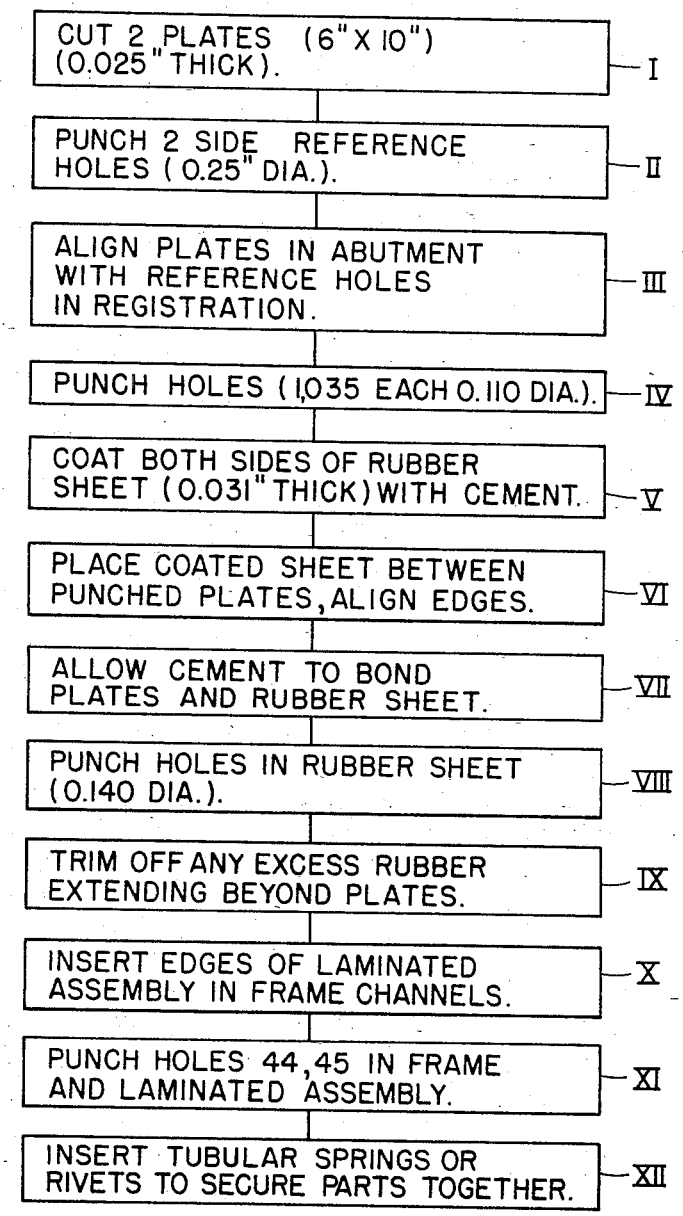
FIG. 14 is a flow chart outlining steps in a preferred method of fabrication of a holder assembly according to the invention.

FIG. 14 sets forth the essential steps in a novel process for fabricating a holder assembly 20, 20A or 20B. First, in Step I, two thin plates of metal or insulative material of any desired thickness, for example about 0.025", as stated, are cut to the same size, for example 6"×10". In Step II, two reference holes 48 are punched in each sheet; see FIGS. 1, 4. In step III, the two plates are abutted, with posts of a jig (not shown) inserted through the reference holes 48 in registration. The holes 26, 26a, or 26b, are then punched simultaneously in the plates. Since the two plates are juxtaposed, this insures that all holes will be disposed in exact registration.

In step IV a sheet 30 or 30' of high temeperature resistant, tough, flexible material such as silicone rubber is coated on both sides with a suitable cement. The thickness of the sheet may be about 0.031 inches; for example, in Step V the coated sheet is placed between the punched plates with holes 26 in alignment. This alignment can again be insured by inserting posts of a jig through reference holes 48. In Step VII the cement is cured chemically, or by heat treatment or the like, to insure complete bonding of the sheet to the inner sides of the plates. In Step VIII, holes 50 are punched in the flexible sheet 30 or 30'. All holes 50 are exactly centered within the respective holes 26, 26a, or 26b in the outer plates to define an annular rim 52 around each hole 50. The holes 50 may be about 0.140', for example, or slightly smaller than the holes 26, 26a, or 26b in the respective plates to define the elastic annular rims 52.

In Step IX, any excess rubber extending beyond the plates is trimmed off. This completes the laminated assembly 25 or 25a, or 25b. In Step X, the frame members 36, 37, 38, are fitted on the edges of the laminated assembly with beveled corners 41, 43 in abutment. In Step XI holes 44, 45 are punched through the frame members and edges of the laminated assembly. In Step XII, roll pins 42, are inserted through the holes 41, 43 in the frame members 36, 37, 38 and laminated assembly 25, 25a or 25b to complete the fabrication of the holder assembly.

By the method described, it is possible to provide holder assemblies which can support thousand of miniature electronic components simultaneously while being processed, tested, stored, and shipped. The holder assemblies are relatively simple in construction, but they are very strong, durable, and will provide long, satisfactory service.

It should be understood that the foregoing relates to only a limited number of preferred embodiments of the invention, which have been by way of example only, and that it is intended to cover all changes and modifications of the example of the invention herein chosen for the purpose of the disclosure, which do not constitute departures from the spirit and scope of the invention.

What is claimed is:

1. A holder assembly for miniature electronic components, comprising:
    a first thin, flat plate having a multiplicity of first holes therein;
    a second thin, flat plate having a multiplicity of second holes therein each centrally aligned with one of said first holes; and
    a thin sheet made of heat resistant, tough, flexible elastic material disposed between said first and second plates and bonded at opposite sides thereof to both of said plates to form a laminated assembly whose thickness is determined by the thicknesses of said plates and said sheet, said sheet having a multiplicity of third holes therein, each of said third holes being centrally aligned with said aligned first and second holes, said third holes being smaller than said first and second holes to define an elastic annular rim around each of said third holes for frictionally gripping one of said components inserted through said aligned first, second, and third holes, the length of each of said components being longer than said thickness of said laminated assembly to project at opposite ends thereof outwardly of said laminated assembly for processing all the ends of said components simultaneously.

2. A holder assembly as defined in claim 1, wherein said alligned first, second and third holes are at least 500 in number for holding at least 500 of said components for simultaneous processing of all of said components.

3. A holder assembly as defined in claim 2, further comprising a frame around said laminated assembly for stiffening the same, said frame having means for supporting said holder assembly while said components therein are being processed.

4. A holder assembly as defined in claim 2, wherein each of said first and second holes is countersunk with its narrower end adjacent to said sheet and wider end at an outer side of each of said plates, to facilitate insertion of said components into said third holes and removal of said components therefrom.

5. A holder assembly as defined in claim 2, wherein each of said plates is made of electrically insulative material so that said components may be tested while supported by said holder assembly, without danger of short circuiting said components through said plates, while said components are being tested electrically.

6. A holder assembly as defined in claim 5, wherein each of said first and second holes is countersunk with its narrower end adjacent to said sheet and wider end at an outer side of each of said plates, to facilitate insertion of said components into said third holes and removal of said components therefrom.

7. A holder assembly as defined in claim 6, further comprising a frame around said laminated assembly for stiffening the same, said frame having means for supporting said holder assembly while said components therein are being processed.

8. A holder assembly as defined in claim 7, wherein said aligned first, second, and third holes are at least 1000 in number, for holding at least 500 of said components for simultaneous processing of all of all of said components.

* * * * *